United States Patent

Hardy et al.

[15] 3,668,329

[45] June 6, 1972

[54] MULTIREGISTER FOR TIME-DIVISION SWITCHING NETWORK

[72] Inventors: Daniel G. Hardy, 47 residence du Raux; Daniel E. Goby, 62 residence du Raux, both of Lannion, France

[22] Filed: Mar. 31, 1970

[21] Appl. No.: 24,299

[30] Foreign Application Priority Data

Mar. 31, 1969 France ................................6909723

[52] U.S. Cl. ..........................................179/18 J, 179/18 ES

[51] Int. Cl. ........................................................H04q 11/00

[58] Field of Search ................179/18 J, 18 ES, 18 EB, 7 MM

[56] References Cited

UNITED STATES PATENTS 3,524,946 8/1970 Pinet et al. ............................179/18 J 3,404,237 10/1968 Bartlett .............................179/18 J X

*Primary Examiner*—William C. Cooper

*Assistant Examiner*—Thomas W. Brown

*Attorney*—Abraham A. Saffitz

[57] ABSTRACT

Multiregister for automatic telephone time-division switching networks having a circulating store for subscriber data in the form of series recorder words, constructions for modifying the breaking or making of subscribers+ circuits, booking access circuit and rebooking circuit for entering modified data, three read-out circuits in the store, and first, second and third series-parallel converters connected to the read-out circuits, whereby a directive address in the circulating store from the first series to parallel converter goes to a processing unit in the second and third series to parallel converter and is modified by the modifying data to permit the modified data to be collected and processed in parallel from the read-out circuits while this modifying data advances into the circulating store, the data after modification being entered in series.

2 Claims, 8 Drawing Figures

INVENTORS.
DANIEL G. HARDY
DANIEL E. GOBY
BY: Abraham A. Saffitz
ATTORNEY

INVENTORS:
DANIEL G. HARDY
DANIEL E. GOBY
BY: Abraham A. Saffitz
ATTORNEY

INVENTORS:
DANIEL G. HARDY
DANIEL E. GOBY
By: Abraham A. Saffitz
ATTORNEY

INVENTORS
DANIEL G. HARDY
DANIEL E. GOBY
BY: Abraham A. Saffitz
ATTORNEY

INVENTORS:
DANIEL G. HARDY
DANIEL E. GOBY
By: Abraham A. Saffitz
ATTORNEY

Fig. 7

| DIRECTIVE ADDRESS | INSTR. | INF. ADDRESS | PARAMETER | FOLLOWING DIRECTIVE |
|---|---|---|---|---|
| 39 | TEST | Box 28, half-word B | 0 | 40 if test pos.<br>41 if test neg. |
| 40 | ENTER. | Box 20-21, half-word B | 0 | 42 |
| 41 | TEST | Box 18, half-word B | 2 | 50 if test pos.<br>39 if test neg. |
| 42 | ADD. | Box 14, half-word A | 1 | 43 |
| 43 | TEST | Box 28, half-word B | 1 | 45 if test pos.<br>44 if test neg. |
| 44 | TEST | Box 20, half-word B | 8 | 60 if test pos.<br>43 if test neg. |
| 45 | TEST | Box 28, half-word B | 0 | 40 if test pos.<br>46 if test neg. |
| 46 | TEST | Box 21, half-word B | 1 | 47 if test pos.<br>45 if test neg. |
| 47 | ADD. | Box 14, half-word A | 1 | |

INVENTORS:
DANIEL G. HARDY
DANIEL E. GOBY
BY: Abraham A. Saffitz
ATTORNEY

MULTIREGISTER FOR TIME-DIVISION SWITCHING NETWORK

The present invention refers to a multiregister for automatic telephone time-division switching networks.

In a time-division switching exchange, the multiregister is the decision making unit. It ensures the connection and disconnection of the communications, having for this purpose peripheral units which respectively carry out the functions of translation, charging and control of the switching network and the concentration units. It is at these latter units that the subscribers lines are concentrated by sampling the analog speech signals from the caller, converting them into PCM signals and time multiplexing said PCM signals and converting into analog speech signals the PCM signals from the called party.

These multiregisters base their decisions on observation of the states of the subscriber line loops which are thus the origin of all orders transmitted to the switching network by the multiregister.

When the receiver is lifted by a subscriber making a call, his address is transmitted by a marker to a free register in the multiregister and this register stores the dialled number. During this storing it also analyzes the entitlement of the calling subscriber to the requested service from the first figures received, so that it can decide what to do with the number; a subscriber who is not entitled to the service corresponding to the number dialled will be connected to a tone generator which is a part of the switching network.

In addition to receipt of the dial number, the multiregister orders the connections and disconnections to be made in the switching network; these may concern two subscribers or even one subscriber and a tone generator.

The multiregister is also required to give instructions to a selection concentrator unit to:

1. allocate a free time slot to a free called subscriber;
2. supervise a subscriber, this operation being carried out before it is cleared at the end of the establishment of a communication when it transmits to the concentrator units the charge for supervising the calling and called subscribers. Then the replacement of one of the receivers will be picked up by the concentrator unit which will turn over its supervising role to the multiregister.
3. release a subscriber after confirmation that he has hung up. This release consists of stopping the sampling of the speech signals by the concentrator unit to which the line of the subscriber who has hung up his receiver is connected.

Finally, the multiregister has, as one of its functions, that of interrogating and controlling the storage units which are the translator and the charging unit. It interrogates the translator store in order to obtain from a subscriber's directory number, the number of his concentrator unit, the number of his line equipment in this concentrator unit and the discriminations of service to which he is subject. It is also connected to the charging unit to which it transmits the information required for working out the charges, namely, the address of the calling subscriber and the rate of charges to be charged.

The multiregister is therefore the basis of all operations linked with the switching. It constitutes a data processing unit the power of which is related to the multiplicity of tasks it has to carry out, the structure of which lends itself to their diversity.

Multiregisters for time-division switching networks are already known in the art, particularly from U.S. Pat. No. 3,524,946, issued on Aug. 18, 1970 to A. E. Pinet et al.

This multiregister, depending on the information transmitted to it by the computer of a time division switching network, takes over the supervising of the time slots of the transmit and receive highways, these highways being the lines on which the PCM speech signals from and to the subscribers who are in communication with each other are multiplexed. This multiregister consists essentially of a double circulating store known as an operational store, one part of which is allocated to the subscribers line addresses and another part to data regarding the state of these lines, two input and output transfer buffer stores causing the operational store to communicate with the peripheral units and a control circuit giving instructions regarding the tones to be sent out on the subscriber's lines.

In accordance with the invention, there is provided a multiregister for time-division switching network comprising a circulating store in which series register-words circulate in cycles, these register-words containing data relating to the subscribers who are to be connected to each other, some data being changeable and the others serving for controlling the changes, program directives for establishing and disconnecting communications and the adresses of these directives, at least three reading-out access circuits in the circulating store where the directive addresses and the changeable and change control data are read-out respectively, a writing-in and rewriting-in access circuit in the circulating store, where the changeable data are re-entered after being changed, first, second and third series-to-parallel converters connected to the said reading-out access circuits, one parallel-to-series converter connected to the writing-in and rewriting-in access circuit, a program store connected to the first series-to-parallel converter and receiving a directive address through it from the circulating store during one cycle of the latter, a processing unit connected to the second and third series-to-parallel converters and receiving through them from the circulating store during the same cycle, the data controlling the changes of the changeable data together with said changeable data, and means for transferring into the processing unit the directive lying in the program store at the address received from the circulating store during this cycle, whereby, in use, the data are collected in series from the circulating store by the reading-out access circuits, are converted in parallel and processed in parallel as they advance into the circulating store and then are entered in series after modification.

An embodiment of the invention will now be described, by way of example only, with reference to the accompanying drawings, in which.

Figure 6:
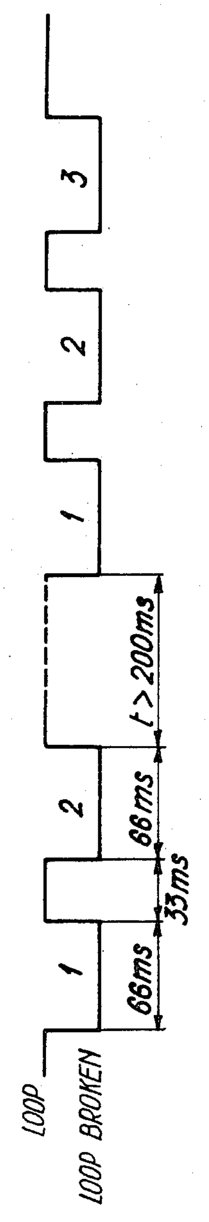
Figure 3:
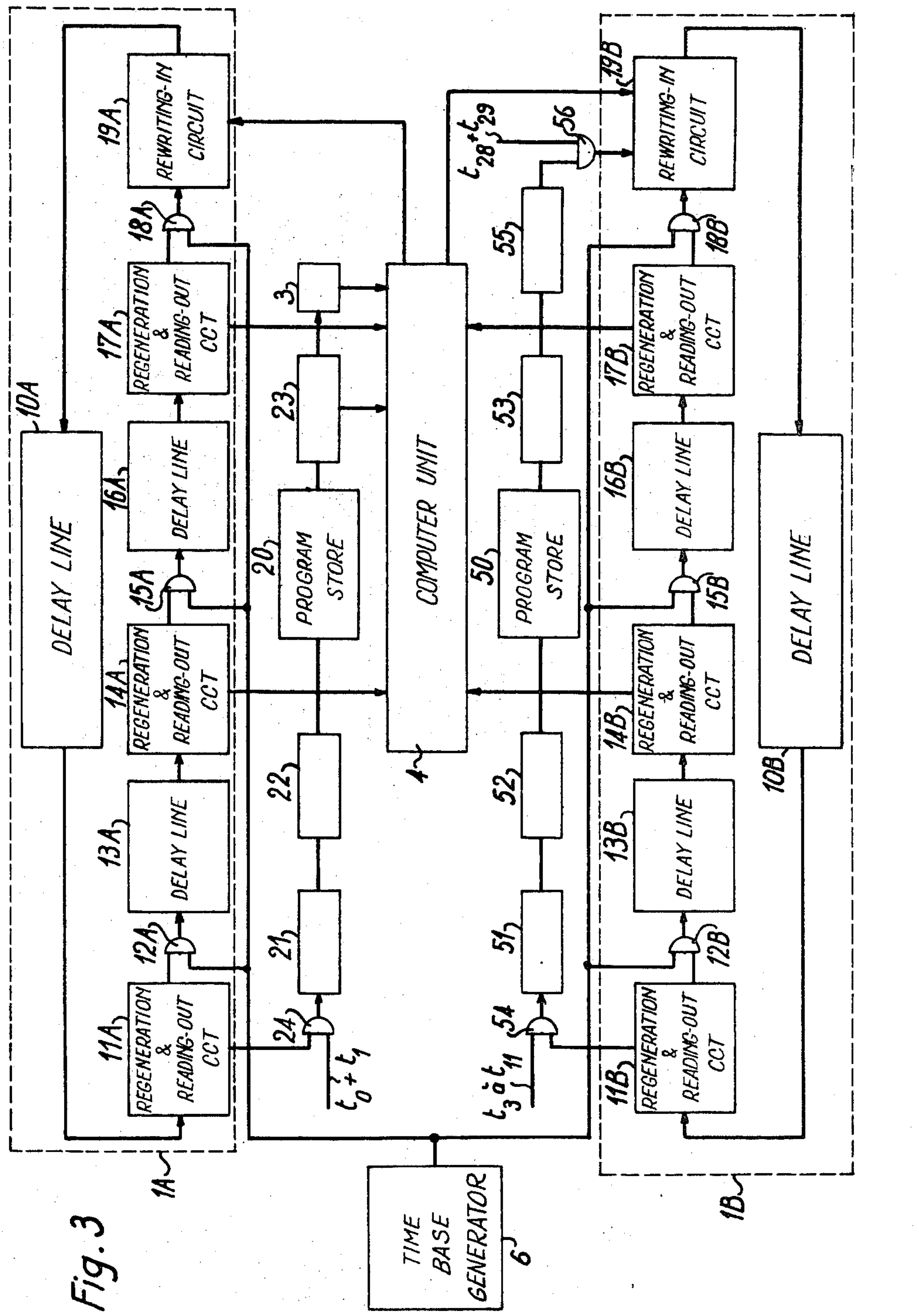
FIG. 3 shows a multiregister with two circulation stores.
Figure 4A:
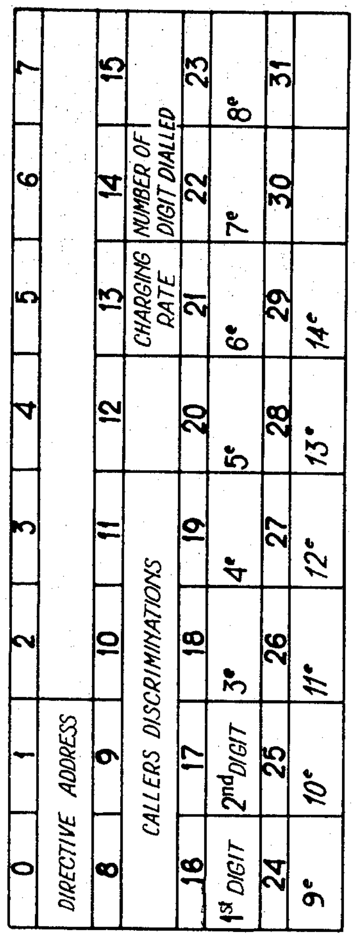
Figure 4B:
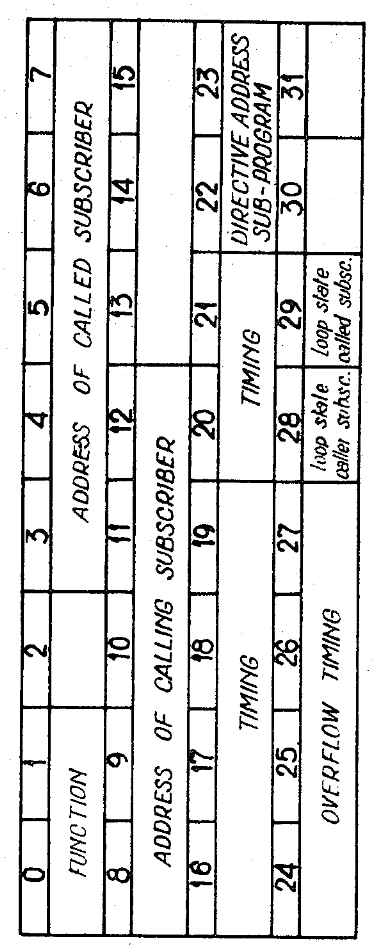
Figure 5:
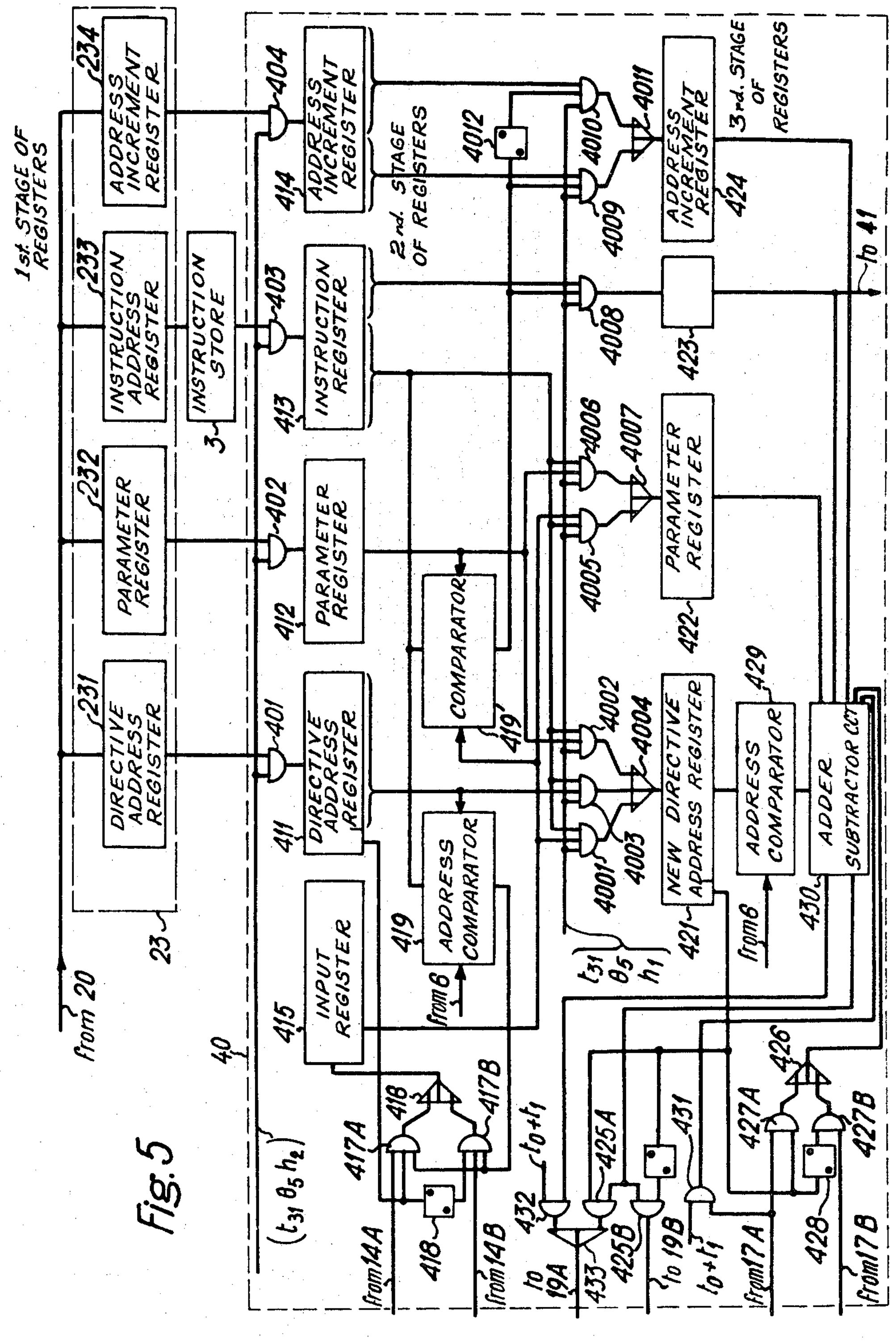

FIGS. 4*a* and 4*b* show the structure of the register-words entered into the two stores of the multiregister in FIG. 3;

FIG. 5 shows the processing unit;

FIG. 6 is a signal diagram to explain the operation of the multiregister; and

FIG. 7 is a program table in order to enable the operating explanations to be followed.

Figure 1:
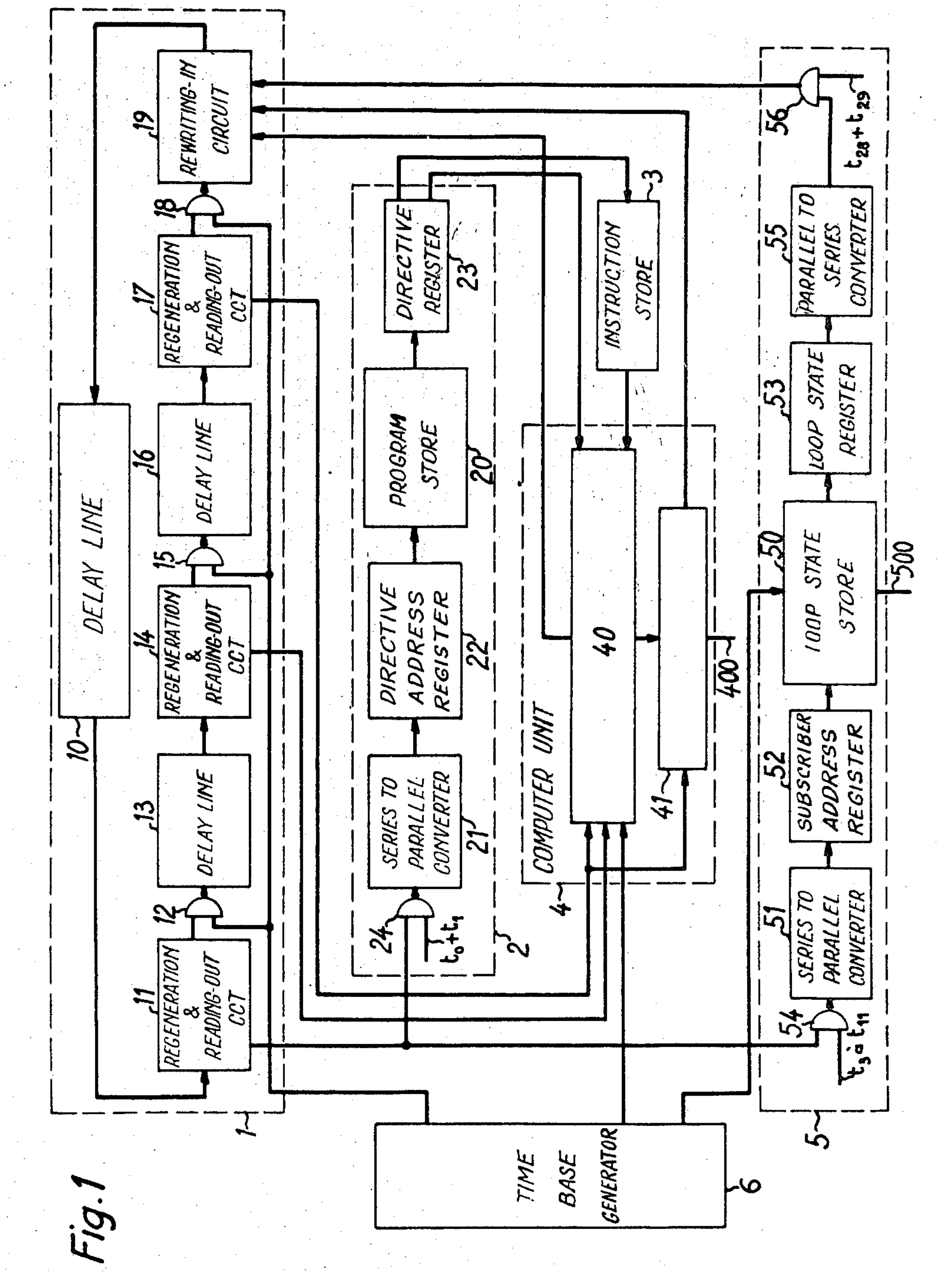
FIG. 1 shows in the form of a block diagram the multiregister for a time-division switching network according to the invention.

FIG. 1 shows the general layout of the multiregister which comprises six main parts:

CIRCULATION STORE

The circulation store is designated as a whole by the reference number 1 and comprising a magnetostrictive delay line 10 looped back on to itself through a chain of circuits. This chain comprises in turn a regeneration and reading-out circuit 11, a magnetostriction delay line 13, a regeneration and reading-out circuit 14, a delay line 16 similar to 13, a regeneration and reading-out circuit 17 similar to 11 and 14, and a writing-in and rewriting-in circuit 19. The output of this writing-in and rewriting-in circuit is connected to the input of the delay line 10.

Store 1 is a circulation store comprising means of reading-out and writing-in in series the data circulating in the line. It is of a conventional type except that the data may be read during a single circulation cycle at three different points on the loop namely at reading-out circuits 11, 14 and 17. The data are entered into the circulation store at a speed controlled by the time base generator 6 which controls the AND gates 12, 15 and 18 inserted in the loop.

This store stores all the necessary information required for establishing or releasing telephone communications. This information is classified in successive words in the store, the capacity of which determines the number of simultaneous communications which can be handled by the multiregister. Also, as these words are processed systematically at each store cycle, the overall propagation time of the store will fix the processing cycle of these words.

PROGRAM STORE

The program store is designated as a whole by the reference number 2. It comprises a semi-permanent store 20 of parallel structure, a series-to-parallel converter 21, a directive address register 22, and a directive register 23 which is the reading register of store 20. The series-to-parallel converter 21 is connected to the reading-out circuit 11 of the circulation store 1 through an AND gate 24 which opens at time $t_0$ and $t_1$ (these times will be defined below). The directive address register 22 consists of 10 triggers to enable selecting by means of a decoder incorporated therein, one word out of 1,024 in store 20, each of these 1,024 words containing 36 binary digits. Each time the store 20 is activated, that word whose address is in the register 22 is read-out and transferred into the directive register 23.

Each directive-word consists of binary digits relating to the directive to be carried out, the address in the circulation store of the register-word to which this directive relates, a parameter as well as the address of the following directive in the form of an increment to be added or deducted from the actual directive address. If the instruction consists of a test, there will be in the directive word two items of information for calculating the address of the following directive relating to whether the test is positive or negative.

INSTRUCTION STORE

The instruction store is designated as a whole by reference number 3. The part of the directive-word relating to the instruction to be carried out only consists of a small number of binary digits, six in all, and it is to be considered as a complex instruction address in a second instruction store 3. This store consists of 64 instruction-words of 20 binary digits each. Its address register is made up of the part of the directive register containing the address of the instruction while its reading register will be considered as an integral part of the computer unit 4 as will be seen below.

The role of this instruction store 3 which is similar to a microprogram matrix, is to establish the equivalents between a complex instruction contained in the directive word and a succession of elementary instructions or orders which can be processed by the computer unit, the latter only being designed to carry out elementary operations such as inscription, addition, subtraction. In addition to the simplification resulting therefore for the computer unit, the advantage of store 3 rests in the flexibility which it brings in regard to the introduction of any new instructions.

COMPUTER UNIT

The computer unit 4 is described in detail below. It is sufficient to mention for the time being that it receives in parallel the contents of the directive register 23, the 20 binary digits of the word read-out from the instruction store 3 and in series the information selected at the reading-out circuits 14 and 17, having the address contained in the directive-word. The unit 4 is also connected to the re-writing-in unit 19 as well as to the time generator 6. It consists essentially of a logic circuit 40 (FIG. 5) used for processing the data contained in the circulation store 1. Logic circuit 40 also permits modifying these data by adding or subtracting a parameter or else transferring them to another location in the circulation store. The circuit 41 consists of interrogation devices for peripheral units such as the markers, translators or charging units and registers for recording the response from these units. Thus it is possible to transmit to the peripheral units information contained in the store 1 or else enter into this store information transmitted by these units. For this purpose circuit 41 has access to store 1 through the reading-out circuit 17 during transmission and to the re-writing-in circuit 19 during reception. The exchange of data is made through the lines 400. Circuit 41 will not be described in detail, as it is part of the peripheral units and does not come within the domain of the invention.

LOOP STATE DETECTOR

The circuit for detecting the loop states 5 operates under the control of an address register 52 connected with the circulation store 1 by means of reading-out circuit 11, reading gate 54 and the series-to-parallel converter 51. The addresses of the calling and called subscribers are thus read-out from the register words systematically each time they pass through the reading-out circuit 11. The loop conditions of the subscriber lines are transmitted to the register 50 by means of the lines 500; for a given subscriber, the line and the time at which the loop state is transmitted on this line are related to the address of the subscriber concerned entered in register 52. The loop states are then transferred to read-out register 53 and, after parallel-to-series convertion in unit 55, re-entered in the register-word by gate 56 and re-writing-in circuit 19. The times taken to read the addresses in slots $t_3$ to $t_{11}$, and to re-enter the loop state in slots $t_{28}$ and $t_{29}$, correspond to the respective locations of this information in the register-word as will be seen below.

The register 50 thus carries out supervision of the subscribers lines; it will not be the subject matter of a detailed description, as it does not form part of the invention and must be considered as a peripheral unit of the multiregister.

TIME BASE GENERATOR

Figure 2:
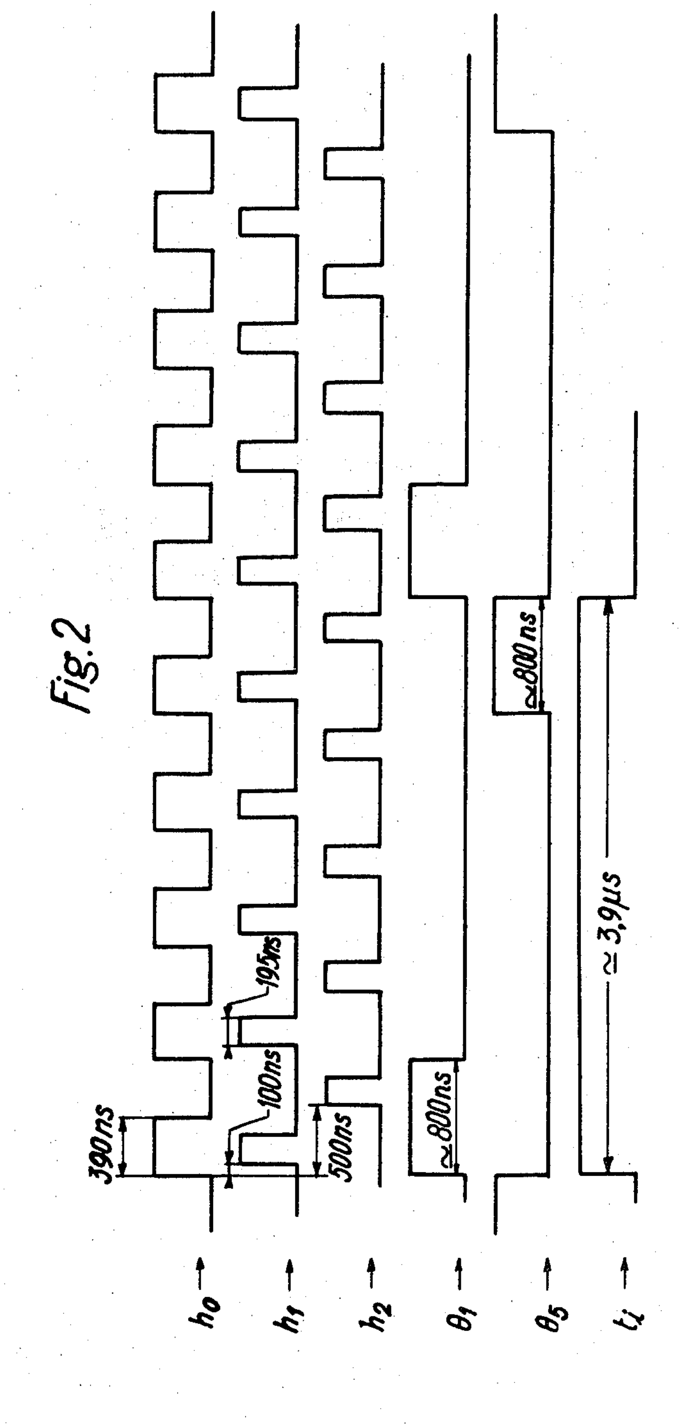
FIG. 2 shows the clock pulses distributed by the multiregister time base generator.

The time base generator 6 supplies different signals shown in FIG. 2. These signals consist of basic pulses $h_0$ in the form of a square wave with a period of 790 ns, and clock pulses $h_1$ and $h_2$ lasting 195 ns and with the same frequency as $h_0$. Pulses $h_1$ and $h_2$ are phase shifted by half a cycle. The time base generator also produces adjacent characteristic signals $\theta_1$ to $\theta_5$, each lasting 790 ns approximately and time slots $t_0$ to $t_{31}$ lasting 3.9 $\mu s$. One of these time slots $t_i$ is shown on FIG. 2. These time slots are also available in parallel binary form in a five-bit code.

The recurrence frequency of time slots $t_i$ is 8 kHz. The elementary time unit or basic unit is the signal $h_0$; it is this signal which controls the advance of the circulating store 1.

The data relating to a call are contained in a register-word which may consists of up to 320 binary digits. The time taken for a register-word to travel through a reading-out or writing-in circuit of the circulating store 1 is 125 microseconds. Because of the present characteristics of magnetostriction delay lines, the bandwidth of which is restricted to approximately 1.5 MHz for a delay of 8 ms for example, it has been necessary to divide the store 1 into two circulating stores 1A and 1B each comprising one delay line 10A and 10B and a loop formed by a chain of circuits, respectively 11A, 12A, 13A, 14A, 15A, 16A, 17A, 18A, 19A and 11B, 12B, 13B, 14B, 15B, 16B, 17B, 18B and 19B. There are therefore two identical circulating stores controlled by the same time base generator and advancing synchronously. The delay on the delay lines 10A and 10B is 8 milliseconds and that of the delay lines 13A, 16A, 13B and 16B, 125 microseconds, making a total delay of 8.250 milliseconds, for each of the circulating stores. This arrangement enables 66 register-words to be written, each lasting 125 microseconds.

The reading-out circuit 11A is connected to the program store 2 through gate 24 and reading-out circuit 11B is connected to the loop state detection circuit 5 through gate 54. Reading-out circuits 14A, 17A, 14B and 17B are connected to the computer unit 4 and the latter is connected to the writing-in circuits 19A and 19B. The output of the loop state detection circuit is connected to the writing-in circuit 19B only through gate 56.

Each register-word is divided into two half-words A and B of 160 binary digits divided into 32 groups each containing five binary digits. Each group coincides with a time slot $t_i$ and each digit in the group with one of the pulses $\theta_1$ to $\theta_5$. The half-words A are entered into the circulating store 1A and the half-words B are entered into the circulating store 1B so that the binary digits of the same weight subsequently appear simultaneously in the reading-out circuits 11A, 11B, or 14A, 14B or 17A, 17B.

The table in FIG. 4 shows the distribution of the information relating to a call being established or disconnected in a register-word. In the half-word A, one finds:

in slots 0 and 1, the address of the directive to be carried out formed by a 10-binary digit address. This address designates a word out of 1,024 words stored in the program store 20 and causes this word to be read-out from the store;

slots 2, 3, 4, 5, 6 and 7 are free;

in slots 8 to 11, 20 binary digits are lined up relating to the service discriminations of the calling subscriber;

the slot 13 contains the charge rate in coded form for the call being made;

slot 14 contains the number of figures received from the beginning of dialling up to the actual time; and slots 16 to 29 enable the recording of the dialling figures at the rate of one figure per slot, the dialling number consisting of not more than 14 figures each in decimal binary coded form.

In the half-word B:

slots 0 and 1 are devoted to a function word which, during an exchange with a peripheral unit, will be transmitted at the head of the message;

slots 3 to 7 contain the address of the called subscriber, composed of the number of the concentrator unit to which the subscriber belongs, the number of his line equipment in said concentrator unit and the number of the time slot allocated to him;

slots 8 to 12 contain the address of the calling subscriber, composed of the number of concentrator unit to which the subscriber belongs, the number of the equipment in said concentrator unit and the number of the time slot;

slots 16 to 19 and 20 to 21 contain the sums of timing pulses enabling calibration of the duration of certain operations, such as the duration of the dialling pulses, and to distinguish from one another the dialling pulses, the dialling pulse trains and the hanging up of the subscriber;

slots 22 and 23 enable storage for a few moments of the address of a particular directive. This corresponds to the following case. It may happen that two different programs have in common identical sub-programs composed of a plurality of determined interlocked successive directives. In such a case, the sub-program may be implemented from the address of its first directive and it is necessary to store the address of the first independent directive following the last directive of the subprogram. It is this first independent directive which is stored in slots 22 and 23;

slots 24 to 27 contain time information known as overflow timing; the role of this is to enable the blockage of a register-word to be detected after a predetermined time in the event of an incident occurring during processing;

slot 28 contains bits which characterize the looped state of the calling subscriber while slot 29 contains the same information for the called subscriber.

The information forming the register-word relating to the subscribers' addresses, the service discriminations and the rates of charge come from the marker or translator units connected to the multiregister. The other information is built up by the computer unit during processing.

From the detailed organization of the store 1 shown in FIG. 3, it results that the complete processing of a given register-word during a cycle of store 1 will extend over a period from the time at which the first binary digits ($t_0$ $\theta_1$) of the first group of the half-words A and B appear in the reading-out circuits 11A and 11B until the time when the last binary digit ($t_{31}$ $\theta_5$) of the last group of these half-words leave the re-writing-in circuits 19A and 19B. This period is made up therefore of three sequences of 125 $\mu s$ which can be broken down as follows:

the first sequence is called pre-reading. It enables the data necessary for processing to be series-to-parallel converted, that is to say, to place the directive address in register 22 and the addresses of the subscribers in register 52. It is also during this sequence that the program store 20 is activated and the directives register 23 filled-in. At the end of this sequence, at $t_{31}\theta_5h_2$, the contents of the directive register 23 and the instruction store 3 are transferred to the computer unit 4 so that it can be ready to read and process any information from the half-words A and B, the first binary digits of which ($t_0\theta_1$) appear in the reading-out circuits 14A and 14B some 300 ns after the transfer instant $t_{31}\theta_5h_2$;

the second sequence is used for reading the information, the address of which is in the computer unit and if necessary carry out a test on this information. It is also during this sequence that the calls to peripheral units are transmitted by unit 41 and the replies from these units are received. At the end of the second sequence during which the register-word concerned has circulated in the delay line 16A and 16B, the modification information for this register-word is transferred into the registers of unit 40;

the third sequence known as the rewriting-in sequence, is devoted to modifying the register-word when passing through the rewriting-in units 19A and 19B. This modification consists of entering the address of the directive to be carried out during the next processing cycle and modifying the information covered by the directive which has just been processed.

This chain reaction may be better understood by reading the following table which clearly shows the simultaneity of the prereading sequences of the register-word of rank $n+1$, processing of register-word $n$ and the rewriting of register-word $n-1$.

| | 0 | +125 $\mu s$ | +250 $\mu s$ | +375 $\mu s$ |
|---|---|---|---|---|
| Prereading | | $n$ | $n+1$ | $n+2$ |
| Processing | | $n-1$ | $n$ | $n+1$ |
| Rewriting | | $n-2$ | $n-1$ | $n$ |

The computer unit of which only part 40 is shown in FIG. 5 meets this special organization. FIG. 5 shows a first stage of registers 231 to 234 which together form the directive register 23 displayed during the prereading sequence. These registers contain an address of nine binary digits in register 231, a parameter of 11 binary digits in register 232, an instruction address of six binary digits in register 233 and finally an address increment of nine binary digits for computing the address of the following directive in register 234. The 36th binary digit of the directive-word is used for checking the imparity of the word. The instruction store 3 has also been shown in FIG. 5 so that the whole of the layout clearly shows the three sequences described above.

At the end of the first sequence, at $t_{31}\theta_5h_2$, the contents of registers 231, 232 and 234 are transferred into the second stage of registers 411, 412 and 414 whose respective capacities are the same as those of registers 231, 232 and 234. This transfer is carried out by means of the AND gates 401, 402 and 404 at the same time as entry is made into the register 413 through gates 403, of the 20 binary digit instruction word from store 3 selected by the contents of the address register 233. An input register 415, which receives data from the reading-out circuits 14A and 14B and through the AND gates 417A and 417B and the OR gate 416, enables up to 10 binary digits read from the half-words A or B to be entered.

An item of information is read-out from the input register 415 under the control of address register 411 whose nine bits define the half-word A or B in which the information is to be read. For this selection:

one bit out of the nine in the address is required for selecting through the AND gates 417A or 417B and the inverter 418, the reading circuits 14A or 14B;

five bits out of the nine in the address are required for selecting the slot out of 32 in which the data to be read are located. When the data comprise 10 bits, they occupy two slots and the five-bit address is the address of the first of the two slots;

three bits out of the nine in the address are required for selecting a digit out of the five of the data group.

The comparison circuit 419 receives in sequence from the time base generator 6 the time slots $t_0$ $\theta_1$ to $t_{31}$ $\theta_5$ and from register 411 the address of the data in the circulating memory to which the directive is to be applied. The coincidence of one of the address being scanned and of the address in 411 enables the opening of gates 417A or 417B to be ordered at the precise moment when the information concerned passes through the reading-out circuits 14A or 14B. The numbers of bits to be admitted into the input register depends on the instruction stored in instruction register 413. An example will be given hereinafter.

The test of the information received in input register 415 consists of a parallel comparison between the data in input register 415 and the parameter stored in parameter register 412. Let us assume that the two first digits of the dialling number distinguish a national from an international call and that 19 are the two first digits of an international call. The parameter is at the first comparison the number 1 in decimal binary coded form and instruction register 413 instructs comparators 419 and 419' to compare four digit numbers (decimal numbers in decimal binary coded form have four bits). Then from time $t_{16}$ $\theta_1$ $h_1$ to time $t_{16}$ $\theta_4$ $h_1$ the four bits of the first decimal digit of the dialling number are entered into input register 415 and comparator 419' compares the four bits received in 415 to the parameter 1 expressed in decimal coded binary form. From time $t_{17}$ $\theta_1$ $h_1$ to $t_{17}$ $\theta_4$ $h_1$, comparator 419' compares the four bits received in input register 415 to the parameter 9 expressed in decimal coded binary form.

At the end of the second sequence in $t_{31}$ $\theta_{5\ 1}$, the contents of registers 411–415 of the second stage are transferred into registers 421–422 of the third stage of the computer. Register 421 receives nine bits giving the same information as register 411, register 422 receives 10 bits relating to the parameter, register 423 receives three bits from 413 which indicate the type of operation to be carried out in the third sequence, mainly: writing or adding or subtracting. Finally, register 424 contains the address increment, i.e., the number by which the present directive address has to be modified in order to obtain the address of the following directive.

Transfers into registers 421 and 422 are governed by register 413, the contents of which state from which registers 415, 411 or 412 the said transfers are to be made. These transfers are carried out through the group of AND gates 4001 4002 and 4003 and the OR gate 4004, and through the group of AND gates 4005, 4006 and the OR gate 4007. Register 413 opens selectively one of the group of gates 4001, 4002, 4003, 4005 or 4006.

The transfer from register 413 to register 423 through the AND gates 4008 may be conditioned by the result of the test at circuit 419'. This is what happens when it is not desired to make a modification in the third sequence unless the result of a test during the second sequence has been found favorable. If the test is negative, register 423 will remain empty and thus no operation will be carried out. Similarly, the contents of 414 are transferred into 424 under control of circuit 419': it is thus possible, therefore, to reach two different directive addresses through gates 4009, 4010, 4011 and inverter 4012 depending on whether a test has been positive or otherwise.

The unit 429 is an address comparator absolutely identical to unit 419; it enables the half-word A or B to be selected in which a modification is to be made by opening the AND gates 425A or 425B and 427A or 427B. The leads from comparator 429 to these AND gates are not represented so as not to encumber the drawings. Circuit 430 is made up of an add-subtract device controlled by register 423. The information to be modified is read in the circuits 17A or 17B while the quantity to be added or subtracted is obtained from register 422. The time at which this modification must be made is itself supplied by comparator address 429.

The parallel-to-series conversion is carried out by unit 430 before rewriting in series form at circuits 19A or 19B through gates 425A or 425B.

The change of directive address is made from address increment register 424 by adding to or subtracting from the directive address contained in the half-word A in slots Nos. 0 and 1, the increment contained in 424. The directive address is read from 17A through the AND gate 431, transmitted to unit 430, the rewriting being made through the AND gate 432, the OR gate 433 and the rewriting-in circuit 19A.

The control connection for unit 41 in FIG. 1 is shown as being carried out from register 423. It has already been seen how this unit has access to the reading-out circuit 17 and rewriting-in circuit 19.

The addition of timing pulses and the overflow timing is not shown on FIG. 5. This is carried out by systematic addition, at each cycle of the circulating store, of one unit to the first binary digit of each of these timings. The values of these timings in fact represent a number of circulating store cycles; the value in ms or seconds is easily deducted therefrom, since a store cycle is equivalent to 8,250 ms.

The processing example which is described below enables illustration of the operation of the multiregister. This processing relates to reception of the number dialled. The pulses transmitted by the subscriber's dial during dialling are formed by a succession of breaks in the loop of his line, as shown in FIG. 6, which represents two pulse trains corresponding to decimal digits 2 and 3.

The description of unit 5(FIG.1) explains how the loop state of the subscriber's line was systematically entered into the half-word B during slots Nos. 28 and 29 (FIGS. 4*b*). The principle of reception of the dialled number therefore will consist of testing the information contained in slot No. 28 since, if this information is equal to 0, this means that the caller's loop is open and if it is equal to 1, that it is closed. FIG. 7 shows all the directive words used for receiving the actual number dialled.

The first address directive which is assumed to be 39 orders the information test "state of caller's loop" contained in slot 28 of half-word B. By referring to FIG. 5 it will be seen that register 411 contains a binary digit indicating that the information to be read is located in half-word B; only gate 417B is open. Five other binary digits from register 411 represent in binary form the combination 28 which is the number of the slot. As has been seen gate 417B will then be passing while in 419 the comparison will take place between contents (28) of register 411 and the signals coming from the time base generator 6. The information relating to the "loop state of the caller" which is a 0 or a 1 is thus transferred during slot 29 into input register 415.

The test operation is then carried out in comparator 419' by comparing the contents of 415 and 412 (the parameter contained in 412 is 0). Depending on the result of the test, the information relating to the following directive the address, i.e., address increment, will be transmitted to 424 through 4009 or 4010, that is, plus 1 if the test is positive (loop broken), or plus 2 if the test is negative (line looped). Depending on the result it will then pass on to the directive address 40 or to the directive address 41. The only operation to be carried out in the third sequence consists of reading through 17A and the AND gate 431 the directive address contained in the half-word A, and adding to it in 430 the contents of 424 and re-entering the result of the addition, during $t_0$, $t_1$, of half-word A through AND gate 432, OR gate 433 and rewriting circuit 19A.

The address directive 41, obtained from 39 when there has been no break in the loop, controls a timing device of 16 seconds corresponding to the time allowed to a subscriber between picking up his receiver and the first dialling pulse. Provided that the timing has not run out (negative test), one returns to directive 39. After waiting for 16 seconds without the loop being broken, the processing is pointed towards the direction of a busy line program which is not the disclosed program.

The directive of address 40 controls the erasure or resetting of the timing indication contained in slot Nos. 20 and 21 of half-word B (FIG. 4*b*).

Register 411 contains the address of slot 20 and the binary digit denoting the half-word B, register 412 contains parameter 0, and instruction register 413 indicates that at the end of the second sequence it is necessary to transfer the contents of 411 into 421, from 412 into 422 and from 414 into 424. The order of rewriting is also transferred into 423.

During the third sequence, in addition to the modification of the directive address by adding the increment +2, the comparator 429 will order at time $t_{20}$ the transfer of the parameter contained in 422, i.e., 0, into slots 20 and 21 of half-word B through the AND gate 425B and circuit 19B.

The reset to zero of the timing indication contained in slots 21 and 21 will then enable the duration of the break in the loop to be calibrated in order to determine whether it relates to a dialling pulse or a premature replacement of the telephone receiver.

The directive of address 42 is reached after detecting a break in the loop and reset to 0 of the timing indication and its object is to control the duration of the dialling pulses. This operation introduces what is commonly called an indirect addressing which will use the information "number of digits dialled" contained in slot No. 14 of half-word A. Before entering the dialling program, a directive will have been used to enter the value 16 in this slot and it is worth noting that the value 16 represents the number of the slot in which the first figure of the number dialled is to be entered. As the directive word contains the address of slot No. 14 of half-word A, it is therefore the information "number of figures received", i.e., 16 which will be entered in input register 415. At the end of the second sequence the contents of 415 will be transferred into the address register 421 through the AND gates 4001 and the OR gate 4004 while the parameter of value 1 contained in 412 is transferred into the parameter register 422 through the AND gates 4006 and the OR gate 4007. The add order is also transferred from 413 to 423 through the AND gate 4008.

It can thus be seen that the addition +1 is made in the third sequence and directed to slot No. 16 of half-word A, hence at the location of the first digit.

The address of the following directive, 43, is re-entered in slots 0 and 1 in accordance with the procedure already described.

Directive 43 orders the test of the loop state of the caller's line and if the test is positive (loop closed), the dialling pulse is ended and the following directive will have the address 45. If the test is negative (loop open) the dialling pulse is not terminated and it is necessary to check the duration of the break in the loop. The following directive will then have the address 44.

Directive 44 orders the timing test, the value of the parameter corresponding to a time of 64 ms. If the timing has reached this value (test positive) the break in the loop can no longer be considered as a dialling pulse and the processing is directed towards the first directive of the hang-up program not disclosed herein. If the test, however, is negative, the following directive will have the address 43.

The directive 45 reached after detection of the closed loop is used to test a new break in the loop. If the test is positive (loop open), it relates to the second dialling pulse of the first decimal dialling digit, and the following directives will be 40, then 42 when the new pulse will be counted in slot 16 of half-word A corresponding to the first decimal dialling digit. If the test is negative, the following directive will have the address 46.

Directive 46 orders the timing test, the parameter value corresponding to a time of 250 ms approximately. If the timing has reached this value (test positive), this denotes that there has been no break in the loop for at least 250 ms and hence the series of pulses corresponding to one digit is ended. The following directive will have the address 47. If the test is negative, the time count has not reached the value and one returns to directive 45.

Directive 47 is reached after receipt of a digit. This event should be noted by ordering an addition in slot 14 of half-word A; the information "number of figures received" then has the value 17 corresponding to the number of the slot in which the second decimal dialling digit is to be entered. The following direction is 39 at which the multiregister waits for breakage of the loop indicating the first pulse of the second decimal dialling digit.

As can be seen, the information "number of figures received" is true to within 16 units since number 16 was entered at the beginning of the count of the digits forming the dialling number, that is to say the number of figures received is equal in binary form to the binary number in slot 14 with the omission of the four digits of lower weight.

What we claim is:

1. In a pulse code modulated time-division telephone switching system having subscriber lines connected thereto and including means for testing said subscriber lines:

a switching processor comprising a circulating store in which series register words circulate in cycles;

said register words containing data relating to the addresses of the subscriber lines which are to be connected with each other, directive address data relating to the addresses of the directives of a program of connection and disconnection of subscriber lines and directive address change control data for controlling the changes of said program directive address data;

said directive address change control data originating from said testing means;

a plurality of read-out circuits inserted along said circulating store where the subscriber line address data, the program directive address data and the directive address change control data are read-out, respectively, at sequential times;

a write-in circuit inserted in said circulating store;

series-to-parallel converters respectively connected to said read-out circuits;

a parallel-to-series converter connected to said write-in circuit;

a directive address register operated by the directive address data contained in the register word and a directive store associated thereto;

a parallel operated computer means for computing the data relating to the address of a new directive from the directive address change control data contained in a register word and from a directive originating from said directive store;

said computer means comprising a plurality of computer stages having inputs and outputs and operated at sequential times respectively coinciding with the read-out sequential times;

said directive address register and computer stage inputs being respectively connected to said read-out circuits through said series-to-parallel converters and said computer means output being connected to said write-in circuit through said parallel-to-series converter whereby, at the successive sequential times, the directive register receives directive address data from the first read-out circuit, the first stage of the computer means receives a directive from the directive store and the directive address change control data from the second read-out circuit, and each other stage of the computer means receives partially processed data from the preceding stage and also from the directive address change control data of the third and following read-out circuits.

2. In a pulse code modulated time-division telephone switching system having subscriber lines connected thereto:

a switching processor comprising a circulating store in which series register words circulate in cycles;

said register words containing data relating to the addresses of the subscriber lines which are to be connected with each other, directive address data relating to the addresses of the directives of a program of connection and disconnection of subscriber lines, and directive address change control data for controlling the changes of said program directive address data;

a plurality of read-out circuits inserted along said circulating store where the subscriber line address data, the program directive address data and the directive address change control data are read-out, respectively, at sequential times;

a write-in circuit inserted in said circulating store;

series-to-parallel converters respectively connected to said read-out circuits;

a parallel-to-series converter connected to said write-in circuit;

a detector of the loop states of the subscriber lines and a store means for storing data representing said loop states and forming part of said directive address change control data;

a directive address register operated by the directive data contained in the register word and a directive store associated thereto;

a parallel operated computer means for computing the data relating to the address of a new directive from the directive address change control data contained in a register word and from a directive originating from said directive store;

said computer means comprising a plurality of computer stages having inputs and outputs and operated at sequential times respectively coinciding with the read-out sequential times;

said loop state detector, directive address register and computer stage inputs being respectively connected to said read-out circuits through said series-to-parallel converters and said loop state store means and said computer means output being connected to said write-in circuit through said parallel-to-series converter whereby, at the successive sequential times, the loop state detector and the directive register respectively receive subscriber line address data and directive address data from the first read-out circuit, the first stage of the computer means receives a directive from the directive store and the directive address change control data from the second read-out circuit, and each other stage of the computer means receives partially processed data from the preceding stage and also from the directive address change control data of the third and following read-out circuits.

* * * * *